United States Patent

Groot

[15] 3,637,314
[45] Jan. 25, 1972

[54] TUBING REFLECTOMETER
[72] Inventor: Cornelius Groot, Schenectady, N.Y.
[73] Assignee: The United States of America as represented by the United States Atomic Energy Commission
[22] Filed: Jan. 13, 1970
[21] Appl. No.: 2,616

[52] U.S. Cl. ..................356/209, 356/198, 356/241
[51] Int. Cl. ..................G01n 21/48
[58] Field of Search ..................250/71, 218; 356/209–212, 237–241, 198

[56] References Cited

UNITED STATES PATENTS

| 2,283,429 | 5/1942 | Ennis | 250/218 X |
| 2,334,475 | 11/1943 | Claudet | 250/71 G |
| 2,682,800 | 7/1954 | Ennis et al. | 356/201 X |
| 2,730,922 | 1/1956 | Beard | 356/210 |
| 2,735,017 | 2/1956 | Beard et al. | 356/198 X |

*Primary Examiner*—Ronald L. Wibert
*Assistant Examiner*—F. L. Evans
*Attorney*—Roland A. Anderson

[57] ABSTRACT

A device for testing the quality of interior walls of tubes, utilizing reflected light inside the tube. The quantity of reflected light in a given section of the tube is measured by means of a photocell and displayed externally of the tubing. The device is movable within the tubing so that all sections of the tubing can be tested.

1 Claims, 1 Drawing Figure

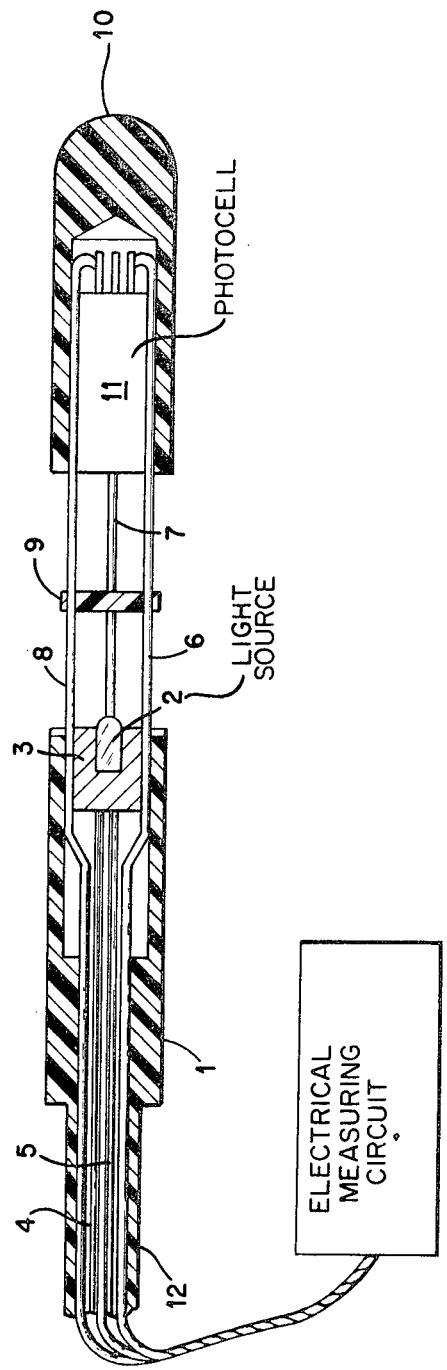

TUBING REFLECTOMETER

BACKGROUND OF THE INVENTION

This invention was made in the course of, or under, a contract with the United States Atomic Energy Commission.

The surface condition of the inside of tubing, especially that used in heat transfer applications, is very important, particularly where the product to pass through the tubes must be guarded from contamination and where fouling of the tube surface must be minimized. The determination of the surface form and condition on the inside of tubing by nondestructive means is very difficult. Tubing can be visually inspected from the open end to a distance of at most 6 diameters with the unaided eye, or to a distance of about 100 diameters with a borescope, as known in the prior art. However, borescopes do not give quantitative results and do not give good images.

SUMMARY OF THE INVENTION

It is accordingly an object of my invention to provide a device for inspecting the inside of tubes that would permit inspection without limit on ratio of length to diameter.

It is another object of my invention to provide a device of the foregoing kind which will give a quantitative readout.

It is a further object of my invention to provide such a device which additionally will not damage or contaminate the tubes being inspected.

Further objects and advantages of my invention will be apparent from the description to follow.

In my invention I have provided a probe which is insertable into the tube being tested and a cord attached to the probe for moving and holding the head within the tube. The probe consists essentially of a light source and a photocell, with a blocking diaphragm between them for preventing the direct passage of light from the source to the photocell. The parts are held in a spaced relationship by support wires, two of which also serve as electrical leads to the photocell.

BRIEF DESCRIPTION OF THE DRAWING

The FIGURE is a cross-sectional view of one embodiment of my invention.

DESCRIPTION OF THE PREFERRED EMBODIMENT

One embodiment of my invention is shown in cross section in the FIGURE. A probe body 1 is provided for holding a light source 2. The probe body 1 may be made of cloth-type Bakelite or other suitable material, and should have an outer diameter slightly smaller than the inner diameter of the tube to be tested. The light source 2 may be a narrow bulb of the "-grain of wheat" type. The light source 2 is mounted in a lamp base 3 which in turn is placed in the probe body 1 as shown. The lamp base 3 may be made of aluminum. Leads 4 and 5 are provided to energize the light source 2, and these leads pass through the hollow center of probe body 1. Three support wires 6, 7 and 8 are symmetrically spaced around the narrower portion of the lamp base 3 and extend outwardly through holes in the flange portion of the lamp base 3. The support leads 6, 7 and 8 extend through a blocking diaphragm 9, which is of lesser diameter than the probe body 1 and should be made of a nonreflecting material. I have found that cloth-type Bakelite is also suitable as the diaphragm material. The diaphragm 9 is provided to block the direct passage of light from the source 2 to a photocell 11, later to be described. The blocking diaphragm 9 enhances the sensitivity of the device by assuring that all the light received by the photocell 11 is obtained from reflection from the walls of the tube being tested.

A probe tip 10 is provided for holding the photocell 11. The probe tip 11 may also be made of cloth-type Bakelite and should be of the same outer diameter as the probe body 1. The closeness of fit between the probe tip 10, probe body 1 and the tube being tested is not of major significance, since little background light will enter a narrow tube and pass to any significant depth therein. The probe tip 10 and probe body 1 should therefore be designed to pass, without binding, through the tube to be tested.

The photocell 11 may be Clairex model CL-604L or equivalent, and is mounted in the probe tip 10 with the three support wires 6, 7 and 8 spaced around the photocell 11 and preferably cemented to it and to the probe tip 10. Two of the support wires, 6 and 8, also serve as electrical leads to the photocell 11 and are soldered to its terminals in the probe tip as shown. The support wires should be stiff enough to maintain the spacing between the probe body 1 and the probe tip 10. I have found that No. 5 (0.014 inch diameter) music wire works well.

Since support wire 7 serves no electrical function, it may be terminated in the vicinity of the lamp base 3. Support wires 6, 7 and 8 are cemented or securely held between the narrow portion of the lamp base 3 and the interior of the probe body 1.

Leads 4 and 5, and wires 6 and 8 are insulated in the probe body 1 by sleeves, which for clarity of the drawing are not shown. Leads 4 and 5 and wires 6 and 8 are brought out of the probe tip 1 into an insulated cord 12, through which they are led to certain circuitry outside the tube being tested.

The cord 12 should be long enough to allow the probe to be inserted through the full length of the tubing being tested, and may be surrounded by a spirally slotted nylon sheath (not shown) to provide free sliding of the cord into a tube, without contaminating the tube.

The electrical circuitry to be used with my invention is conventional and is therefore not shown in the drawing. The light source leads 4 and 5 may be connected to an appropriate AC source of, for example, 5 volts. The support wires 6 and 8 may be connected so as to make the photocell 11 the fourth arm in a conventional DC bridge circuit, using a voltmeter to measure the imbalance in the bridge.

With my invention constructed as described, a hollow cone of light will be received by the photocell when the light source is on and the probe is inserted in a tube. All the light in the hollow cone is reflected light from the wall of the tube at approximately whatever depth the diaphragm is placed. The cord 12 can be marked to determine the diaphragm depth at a given time. The smoother and cleaner the tube wall is, the brighter the reflected light. Accordingly, a short length of tubing having a certain quality of interior wall may be used as a standard, and the bridge adjusted so as to obtain approximately a midscale reading when the probe is inserted in the standard tube. The probe can then be inserted in test pieces and their quality determined relative to the standard tube by observing the voltmeter readings, a larger voltage being indicative of more brightness and consequently of an interior quality better than that of the standard, and a lower voltage indicating a lesser quality than that of the standard.

The circuitry described above for use in one embodiment of my invention can be very compact and can be placed in the same casing with the voltmeter. Such a casing may also contain a reel of probe cord. Thus the entire apparatus is quite portable, an improvement over prior reflectometers which were relatively stationary and necessitated bringing the tubing to the test apparatus.

I claim:

1. A tubing reflectometer comprising:
    a probe insertable in said tubing, said probe having a tip and comprising:
        a light source for projecting light on a portion of the interior of said tubing,
        photoelectric means mounted in the said tip for receiving light from said source reflected from said portion of the tube interior,
        a plurality of wires for holding the light source and the photoelectric means in spaced-apart relationship wherein some of said wires are electrical leads to the photoelectric means, and a blocking diaphragm mounted on said wires between said source and said photoelectric means, for preventing direct passage of light from said source to said photoelectric means; and an electrical measuring circuit electrically connected to said photoelectric means through said wires, for measuring the amount of light received by said photoelectric means.

* * * * *